United States Patent Office 3,393,926
Patented July 23, 1968

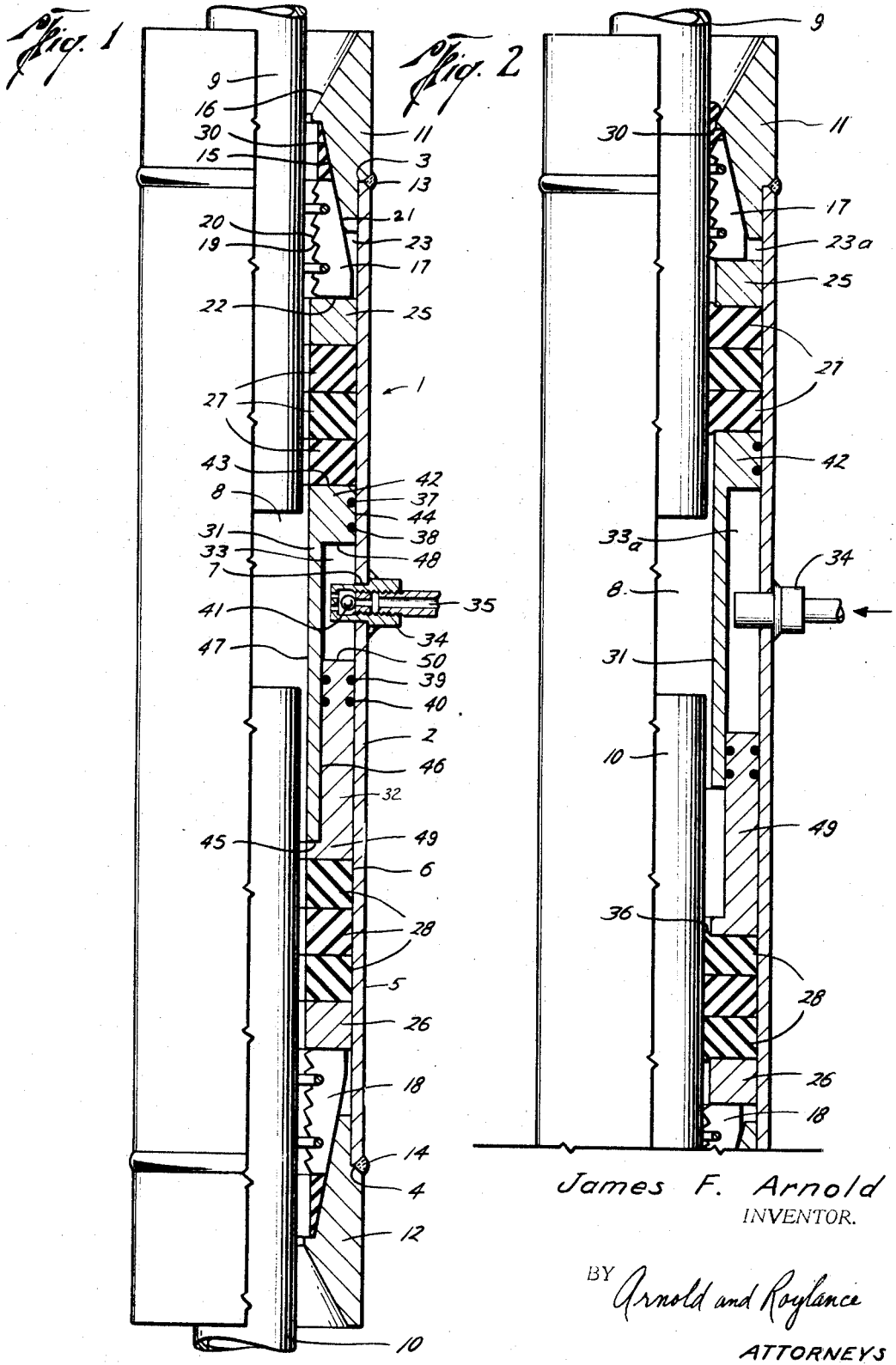

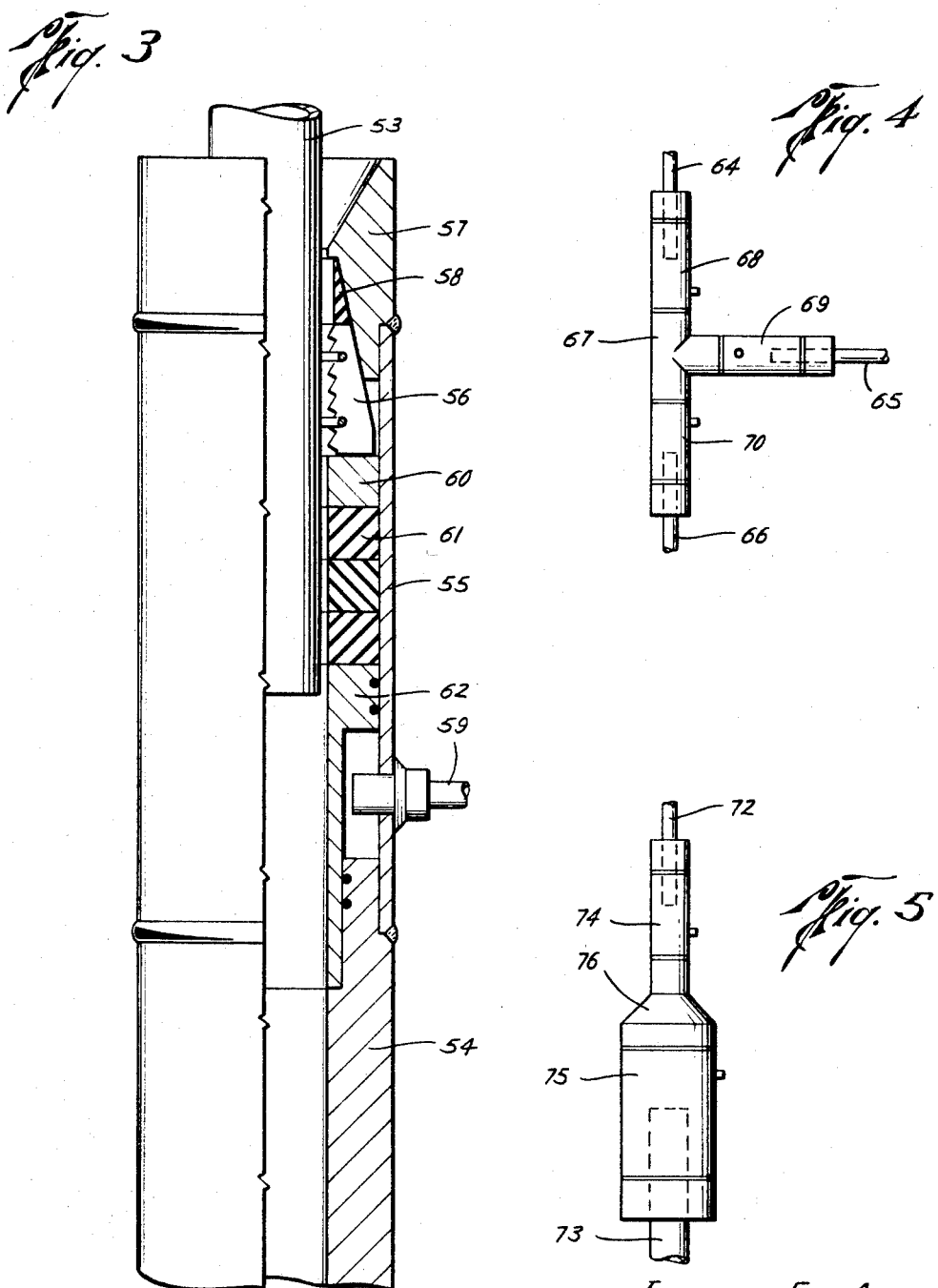
James F. Arnold
INVENTOR.

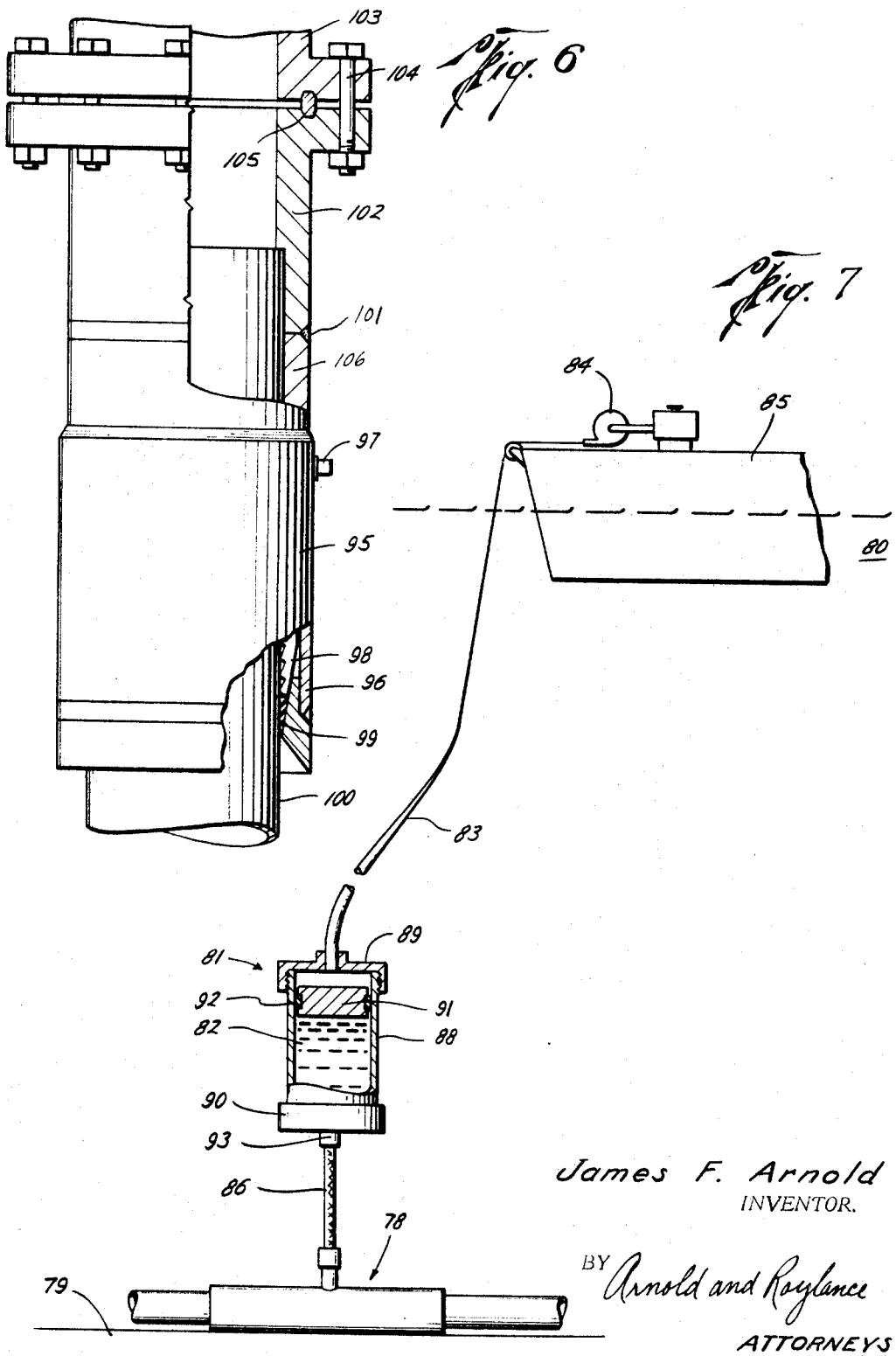

3,393,926
HYDRAULIC COUPLING
James F. Arnold, 4029 9th St., Marrero, La. 70072
Filed Sept. 9, 1965, Ser. No. 486,154
12 Claims. (Cl. 285—18)

ABSTRACT OF THE DISCLOSURE

A method is provided for joining together two lengths of pipe in an environment wherein conventional methods are not suitable, e.g., underwater. Apparatus for use in such method is also provided, the apparatus including an elongated tubular casing for fitting around a length of pipe to be joined, an opening in the casing communicating to an exterior source of fluid under pressure, at least one piston adjacent the opening, and resilient sealing means and gripping means disposed axially from the piston. Upon entry of fluid under pressure through said opening, the piston is forced axially toward the sealing means and gripping means, whereupon these elements move into sealing engagement with the pipe inside the casing.

---

This invention relates to a method and apparatus for joining together two lengths of pipe, and for repairing a faulty section of pipe. The invention is especially useful in those environments in which conventional methods are not suitable, and requires no special preparation or pretreatment of the lengths of pipe to be joined.

Briefly, the invention comprises a method suitable for joining together lengths of pipe comprising affixing a coupling to the lengths of pipe to be joined, and introducing into said coupling a fluid under pressure in order to securely grip each of said lengths of pipe, whereby there is formed within said coupling an area in fluid communication with said lengths of pipe, and in fluid isolation with all areas exterior of said coupling.

The invention further comprises apparatus suitable for joining together lengths of pipe comprising a tubular casing, at least one piston slidingly mounted in said casing and movable axially therein upon application of pressure from a source on the exterior of said casing, resilient engaging means located within said casing and actuable upon axial movement thereof into engagement with a length of pipe to be joined, and gripping means located within said casing and movable axially therealong, said means and being actuable by axial movement thereof into engagement with said length of pipe to be joined, wherein axial movement of each said engaging means and said gripping means is effected by axial movement of said piston.

Further the invention comprises apparatus suitable for use in connecting together lengths of pipe comprising an elongated housing, a pair of axially spaced apart annular guide means in the housing, gripping means located between the guide means and movable upon actuation along the housing and radially inwardly from a position of nonengagement with the pipe lengths to a position of engagement with the lengths, resilient engaging means located between the guide means and compressible upon actuation from a first position of nonengagement with the lengths of pipe to a second position of engagement with the lengths, a pair of pistons in sliding engagement movable axially along the housing, the pistons adapted to actuate the gripping means and the engaging means, the pistons having a space therebetween, which space is in fluid communication through a conduit to a source of pressurized fluid, whereby fluid under pressure may be introduced into the space thereby moving the pistons apart and actuating the gripping means and the engaging means.

In another embodiment, the invention comprises apparatus suitable for joining a length of pipe to other lengths, comprising a tubular casing having guide means at the first end thereof and connected at the other end to a housing, the first end being adapted to fit over the length of pipe, an annular piston located within the casing and adapted for movement axially along the casing toward the first end of the casing, resilient engaging means located in the casing between the movable piston and the first end and adapted to move into sealing engagement with the length upon actuation by axial movement thereof and gripping means located in the casing between the movable piston and the first end and adapted to move into gripping engagement with the length upon compression by axial movement thereof, whereby axial movement of each the engaging means and the gripping means is effected by axial movement of the piston.

Many problems are inherent in connecting together two or more conduits in certain environments, for instance under water or in an area where there exists the danger of explosion. With the rapid increase in the use of conduits in these areas within recent years, this problem has become one of major concern among workmen and engineers.

This invention provides improved method and apparatus for solving this problem, and for ensuring the safe and easy joining of conduits in such problem areas without the necessity of costly or laborious pretreatment.

In order that the manner in which the foregoing and other objects attained in accordance with this invention can be understood in detail, one advantageous embodiment of the invention will be described with reference to the accompanying drawings, which form a part of this specification, and wherein:

FIGURE 1 is an elevational view, partly in section, of a coupling constructed in accordance with one embodiment of this invention, showing the coupling in position after two lengths of pipe to be joined have been inserted in the coupling, but before the coupling is actuated.

FIGURE 2 is a view similar to FIGURE 1, illustrating the coupling of FIGURE 1 in its actuated position.

FIGURE 3 is an elevational view, partly in section, of a coupling constructed according to another embodiment of this invention.

FIGURE 4 is a perspective view of a means for connecting conduits in accordance with another embodiment of this invention.

FIGURE 5 is a perspective view of a means for connecting conduits in accordance with yet another embodiment of this invention.

FIGURE 6 is an elevational view, partly in section, of a means for adapting a well-head, in accordance with yet another embodiment of this invention.

FIGURE 7 is a pictorial view illustrating a particularly preferred arrangement for introducing a pressurized fluid into a coupling constructed in accordance with this invention.

Referring now to the drawings in more detail, there is illustrated in FIGURES 1 and 2 a coupling 1 constructed in accordance with one embodiment of this invention. Coupling 1 includes an elongated tubular housing or casing 2 having ends 3 and 4, a cylindrical exterior surface 5, a generally smooth cylindrical internal surface 6, and an opening 7 therein near the transverse center thereof.

Means for securely engaging the two lengths of pipe 9 and 10 to be joined and for forming a permanent seal with these lengths of pipe are located inside the casing 2 and occupy an annular area the inside diameter of which is slightly greater than the outside diameter of the two lengths 9 and 10.

The above-mentioned means for engaging the pipe and forming a permanent seal have been desirably found to include (1) means for guiding the lengths of pipe into the coupling; (2) means for securely gripping the lengths of pipe; (3) means for effecting sealing engagement with the pipe lengths; and (4) means for actuating said gripping and sealing means.

Guide means conveniently take the form of members 11 and 12 located at each end of coupling 1. In the FIGURE 1 embodiment, such members are constructed as separate parts firmly secured to the ends 3 and 4 of casing 2 as by welds 13 and 14. It is understood, however, that guides 11 and 12 could be constructed as integral parts of the casing 2, if desired. Guide members 11 and 12 include a conical-shaped inwardly tapering surface in a direction away from the transverse center of the coupling which provides a cam surface 15, and a conical-shaped outwardly tapering surface in a direction away from the transverse center of the coupling which provides a guide surface 16. Cam surface 15 serves to convert a portion of the longitudinal movement of the gripping means into radial movement when such means contact this surface, thus allowing the gripping means to firmly grip the lengths of pipe to be joined. Guide surface 16, of course, serves to guide the lengths of pipe to be joined into the coupling. While it would not be absolutely necessary to provide both cam surface 15 and guide surface 16 in a single part, such an arrangement has been found to be particularly advantageous.

Gripping means are conveniently located axially inwardly of said guide means, and take the form of slips, segments of which are shown at 17 and 18. Such slips are movable axially within a certain distance inside the slip bowls 11 and 12. Any convenient number of slip segments may be included in each slip bowl, for example three. Such segments are desirably constructed of steel, and include at the inside diameter thereof radially inwardly facing teeth 19 and radially outwardly facing tapered surfaces 20, conical-shaped tapered surface 21 at the outer diameter thereof and generally flat end faces 22. The tapered surfaces 21 are adapted to contact the similarly-shaped cam surfaces 15 of guide members 11 and 12 whereupon said slips are caused to move radially inwardly. As is readily seen from FIGURES 1 and 2, the slips are free for axial movement within the area 23, and 23a illustrates the unoccupied area after the slips have been so moved by a longitudinal force transmitted by junk ring 25, which abuts the end faces 22 of slip segments 17. Junk rings 25 and 26 are desirably constructed, for example, of hard steel, and transmit axial force from engaging and sealing means, such as the side face of end packing ring 27, to the slips.

Such means for securely engaging the pipe lengths to be joined and forming a seal therewith are conveniently located between the slips and the transverse center of the coupling, and conveniently take the form of packing rings 27, 28. Packing rings 27 and 28, which are no thicker than the interior dimensions of the coupling, must be resilient to some extent so that when placed under pressure they will deform to firmly press against the lengths of pipe 9 and 10 to be joined, as is clearly shown in FIGURE 2. Any suitable material of construction may be used for rings 27, 28 as long as it is resilient and generally heat resistant. Hard rubber, asbestos, lead, and soft copper have been found to be useful. Although three packing rings 27, 28 are illustrated in FIGURES 1 and 2 at each end of the coupling, it is understood that any suitable number might be employed. Also, the packing rings may be of any suitable shape, for example V-shaped rings.

As a further sealing means against the length of pipe to be joined, it has been found advantageous to include in some embodiments a hard rubber insert 30 adjacent the slips on the side thereof away from the transverse center of the coupling. Under pressure, this insert will also be deformed to occupy the annular space between the guide and slip bowl 11 and the pipe 9, and thus form an effective seal therebetween.

Power operated means for actuating the engagement means and the gripping means may take various forms, but the embodiments shown in FIGURES 1–3 have been found particularly advantageous. Such means are illustrated in FIGURES 1 and 2 as a pair of members movable axially along the coupling apart from one another upon the application of pressure therebetween. Thus, such members may take the form of male piston 31 and female piston 32. Male piston 31 is desirably constructed as shown in FIGURES 1–3, wherein it is a generally tubular member having an elongate portion which includes a cylindrical external surface 46 and a cylindrical internal surface 47, and also having an enlarged end portion 42. End portion 42 includes a generally flat annular end face 43, an opposite annular face 48, and an outer cylindrical surface 44 which has a diameter substantially equal to the diameter of the inner wall 6 of casing 2, and which is sealingly engaged with the inner surface 6 of the casing 2 between annular faces 43 and 48. At the end of the male piston 31 opposite the generally flat annular face 43 is another generally flat annular end face 45. Female member 32 is desirably constructed as shown in FIGURES 1 and 2, wherein it is a generally tubular member which has an outer cylindrical surface of a diameter substantially equal to the diameter of the inner wall 6 of casing 2. It is mounted with the outer cylindrical surface in sealing engagement with the inner wall 6. An inner cylindrical surface is in sealing engagement with the elongate portion of male piston 31. In this embodiment, the piston 32 includes a radially inwardly projecting flange 49 at one end thereof, and a generally flat annular end face 50 at the opposite end thereof. Male piston 31 and female piston 32 are separated in the initial position by a space 33 which is in communication through inlet 34 in opening 7 with an inlet conduit 35. Space 33 is defined by annular face 48 and cylindrical surface 46 of male piston 31, end face 50 of female piston 32, and the inner face 6 of casing 2. As is readily apparent from FIGURES 1 and 2, pistons 31 and 32 will, upon application of pressure (as by filling the area 33 between the pistons with a fluid under pressure), slide apart until the slips are no longer free to move. At this point, the pressurized fluid will occupy an increased area 33a as seen in FIGURE 2, and the packing rings 27, 28 will be in sealing engagement with the lengths of pipe 9 and 10, as seen at 36 in FIGURE 2.

Means are employed to exert pressure against the pistons 31 and 32. Such means conveniently take the form of a pressurized fluid, and it has been found particularly advantageous to introduce a hardenable material such as cement or an epoxy resin into the area 33. Upon setting, the hardenable material will thus occupy the enlarged area 33a without the necessity of further application of pressure in this area, and thus the connections at the inlet 34 may be removed. In this manner, convenient means are employed to lock the power operated means so that space 33a is not decreased.

O-rings 37, 38, 39 and 40 are employed to ensure a tight seal as the male and female pistons slide apart from each other.

Check valve 41 is desirably included in the inlet conduit to admit fluid into the space 33 while preventing the fluid in that area from returning to the inlet conduit 35.

In FIGURE 3 is illustrated an embodiment which is especially useful when only one free length of pipe 53 in to be joined to a manifold or the like. In this embodiment, the cylinder 54 is fixed, and in this embodiment there is no need for separate casing 55 in the area of this cylinder, as it is desirably formed as an integral unit with the casing. At the end of the coupling adjacent pipe 53 are slips 56 resting in guide and slip bowl 57. Here again a resilient insert 58 is desirably included. Between the inlet conduit 59 and slips 56, as in the FIGURE 1 embodiment, are junk ring 60, packing rings 61, and annular piston 62. At the end opposite pipe 53 there are no slips, packing rings, guide, etc., as such are unnecessary. As will be readily understood, this embodiment operates in the same manner as the FIGURE 1 embodiment, except that upon pressurizing through inlet 59 only piston 62 and its associated rings and slips are movable, while cylinder 54 is fixed.

The FIGURE 3 embodiment is especially useful in the embodiments illustrated in FIGURES 4 and 5. In the FIGURE 4 embodiment, three lengths of pipe 64, 65, and 66 are joined at a T 67. In this instance, three separate couplings (for instance those of the FIGURE 3 type) 68, 69, and 70, are securely fastened to T 67 and are used to securely lock the pipe sections thereto.

In the FIGURE 5 embodiment, a length of pipe 72 is joined to a length of pipe 73 of larger diameter by means of two couplings 74 and 75 constructed in accordance with this invention which are joined together by a coupling piece 76.

As will be readily recognized, any number of different lengths of pipe, or any different sizes of pipe, or any type of connection can be readily employed in the manner generally illustrated by the FIGURES 4 and 5 embodiments. For one example, a number of lines from separate offshore wells may be joined at a common manifold.

As one example of the operation of a coupling constructed in accordance with the embodiment of FIGURES 1 and 2, it may be desired to join together two lengths of pipe 2 and 3 which are underwater. Coupling 1 will be lowered to a diver, who guides pipe 9 into the coupling by means of the guide 11, and pipe 10 into the coupling by means of guide 12. After the pipes 9 and 10 are in approximately the position shown in FIGURE 1 (stops or any other convenient means may be employed to signify to the operator when this position has been reached) all air and/or water may be bled out of the area 33 by means of a release line (not shown). Then a pressurizing fluid such as a hardenable cement is brought into the area 33. This, of course, causes longitudinal movement of the pistons 31 and 32, which forces, through packing rings 27, 28 and junk rings 25, 26 the slip segments 17, 18 against the cam surfaces of guide members 11, 12. The slips are moved radially inwardly in response to this axial movement until they firmly grip the outer surfaces of pipes 9, 10. After the slips are thus "set," further movement of the pistons causes axial compression of the packing rings 27, 28 which expands these rings radially into sealing engagement with the outer surface of the pipes 9 and 10. The inlet connection is then removed and the pipes 9 and 10 are seen to be securely joined, with the flow there between progressing, of course, through the area 8 which is in fluid communication with the interior of each of pipes 9 and 10 and in fluid isolation with all areas outside coupling 1.

If the tool is to be used to repair a faulty section of pipe, it is usually preferred that the pipe length be cut in the area of the leak or otherwise faulty section. Then the coupling is guided over the severed portion and set as described above. It is possible, of course, that in some instances it will be desired to slide the coupling for a long distance over a length of pipe rather than to cut the pipe in the damaged area.

In FIGURE 7 is illustrated a particularly advantageous means for pressurizing a coupling 78 constructed in accordance with this invention which is located adjacent the floor 79 of the ocean or other body of water 80. As illustrated, such means conveniently take the form of a tubular member 81 which contains the material to be used for pressurizing the coupling, as for example and epoxy resin 82. The tube 81 is adapted to be readily connected through a flexible conduit 83 to a pump 84 in fluid communication with a source of fluid under pressure at the surface of the water, for example on a boat 85, and is further adapted to be readily connected through a conduit 86 to the coupling 78. The tube 81 is comprised of a generally cylindrical hollow casing or housing 88 having caps 89 and 90 at the extremities thereof, and a piston 91 axially movable therein, said piston being conveniently held in sealing engagement with the casing 88 as by means of seal 92. There is provided means such as nozzle 93 at the end of the tube 81 adjacent cap 90 of exit of the material 82 into the conduit 86.

As will be readily understood, in a preferred embodiment of the operation of this pressurizing device, a diver may take with him to the location of the coupling the tube 81, and at that point connect the tube to the flexible conduit 83 and the conduit 86. The pressurized fluid from the source at the surface is then pumped into the tube 81, moving the piston downwardly in the tube and forcing the hardenable material through nozzle 93 into the conduit 86 and thence into the coupling 78. Actually, conduit 86, which may be flexible, may not be necessary as the nozzle 93 may be connectable directly onto the coupling 78.

The hardenable material thus fills space 33 and forces pistons 31, 32 apart. As will be understood to those skilled in the art, the hardenable material such as an epoxy may include a catalyst or setting agent to cause it to set or become hardened at a certain time.

In FIGURE 6 is illustrated another particularly advantageous application of this invention. Here the coupling 95 is illustrated in its use as a well-head adapter. As will readily be understood from the above description, a coupling 95 constructed, for example, in a manner illustrated in the embodiment of FIGURE 3, comprising housing 96, inlet 97 in communication with an annular space (not shown), pistons (not shown), engaging means (not shown), slips 98 and insert 99, is inserted onto the tubular casing 100 of a well, and is joined as by weld 101 to a casing head 102. A blowout preventer or well assembly having a bottom flange 103 is securely joined as by bolts 104 to the casing head, with seal rings 105 being inserted to prevent unwanted fluid communication between the interior of the casing and the area exterior casing head 102.

Thus, it is seen that a tool is provided which is suitable for joining together two lengths of pipe, requiring no special preparation of the ends of the pipe to be joined. Tools constructed in accordance with this invention are especially useful in joining lengths which are located in difficult working environments. For example, the invention is especially suitable for work underwater, as in connection with offshore wells. As another example, the invention is particularly useful in hazardous environments such as refineries where there is a danger of explosion and conventional methods which employ welding are ruled out because of this danger. Still further, the invention is especially advantageous for use in connection with shipboard piping systems.

The invention is also particularly useful in prepairing a length of faulty pipe. When so used, the faulty pipe may be cut near the leak, or the faulty section may be completely cut out. Then the pipe is joined by a coupling constructed in accordance with this invention.

While the invention has been described in terms of particularly useful embodiments, it will be apparent to those skilled in the art that various changes might be made without departing from the scope of this invention. It will be understood that the term "pipe" as used in the appended claims would include a structure such as the casing illustrated in FIGURE 6.

I claim:

1. Apparatus suitable for use in connecting a length of pipe to a suitable tubular member in difficult working environments comprising:

an elongate generally tubular housing of a diameter greater than the diameter of the pipe length to be joined, said housing adapted to be fitted around said pipe length to define axially-extending annulus between the outer surface of said pipe length and the inner wall of said housing;

an elongate member mounted in said annulus substantially free of contact with said pipe length, and further mounted such that a portion of said elongate member is in sealing engagement with the inner wall of said housing;

a first piston member mounted in said annulus substantially free of contact with said pipe length, and further mounted such that
a first portion thereof is in sealing engagement with the inner wall of said housing, and
a second portion thereof extends axially from said first portion toward said elongate member, and is in sealing engagement with said elongate member, said piston member being free for limited axial movement within said annulus, whereupon such movement said first portion moves axially along the inner wall of said housing and said second portion moves axially along said elongate member;

an annular space being defined between said first portion of said piston member and said elongate member;

an inwardly sloping cam surface on the inner wall of said housing axially spaced from said piston member, said surface facing toward said piston member;

gripping means disposed in said annulus adjacent said cam surface, and adapted to move axially upon actuation into contact with said cam surface and to be thereby radially moved into gripping engagement with said pipe length;

resilient engaging means mounted in said annulus between said piston member and said gripping means, and substantially free of contact with said pipe length, said resilient engaging means adapted to move axially, upon actuation, an amount sufficient to move said gripping means against said cam surface, and upon further actuation to be compressed into sealing engagement with the outer surface of said pipe length on one side and the inner wall of said housing on the other to effect a seal between said housing and said pipe length;

actuation of each said resilient engaging means and said gripping means being effected by axial movement of said piston member toward said cam surface; and a source of fluid under pressure remote from said housing but connected through an opening in said housing into fluid communication with said annular space, whereupon entry of fluid under pressure into said annular space is effective to axially move said piston member toward said cam surface.

2. Apparatus in accordance with claim 1, wherein said apparatus further comprises means to fix said piston member in place with said gripping means in gripping engagement with said pipe and said resilient engaging means in sealing engagement with said pipe.

3. Apparatus in accordance with claim 1, wherein said elongate member is a piston which is free for sliding axial movement within said annulus simultaneously with said first piston member.

4. Apparatus in accordance with claim 1, wherein guide means are included adjacent an end of said housing to facilitate insertion of said pipe length into said housing.

5. Apparatus suitable for use in connecting a length of pipe to a suitable tubular member in difficult working environments comprising:

an elongate generally tubular housing of a diameter greater than the diameter of the pipe length to be joined, said housing adapted to be fitted around said pipe length to define an axially-extending annulus between the outer surface of said pipe length and the inner wall of said housing;

an elongate member mounted in said annulus substantially free of contact with said pipe length, and further mounted such that a portion of said elongate member is in sealing engagement with the inner wall of said housing;

a first piston member mounted in said annulus substantially free of contact with said pipe length, and further mounted such that
a first portion thereof is in sealing engagement with the inner wall of said housing, and
a second portion thereof extends axially from said first portion toward said elongate member, and is in sealing engagement with said elongate member;

said piston member being free for limited axial movement within said annulus, whereupon such movement said first portion moves axially along the inner wall of said housing and said second portion moves axially along said elongate member;

an annular space being defined between said first portion of said piston member and said elongate member, an inwardly sloping cam surface on the inner wall of said housing axially spaced from said piston member, said surface facing toward said piston member;

gripping means disposed in said annulus adjacent said cam surface, and adapted to move axially upon actuation into contact with said cam surface and to be thereby radially moved into gripping engagement with said pipe length;

resilient engaging means mounted in said annulus between said piston member and said gripping means, and substantially free of contact with said pipe length, said resilient engaging means adapted to move axially, upon actuation, an amount sufficient to move said gripping means against said cam surface, and upon further actuation to be compressed into sealing engagement with the outer surface of said pipe length on one side and the inner wall of said housing on the other to effect a seal between said housing and said pipe length;

actuation of each said resilient engaging means and said gripping means being effected by axial movement of said piston member toward said cam surface; and a second tubular member adapted to be positioned remote from said housing, said second tubular member having an axially movable cylindrical member therein dividing said second tubular member into first and second portions,
said first portion having fluid therein and being in fluid communication through a suitable conduit with said annular space,
said second portion being in fluid communication with a source of fluid under pressure, and in fluid isolation with said first portion,
wherein application of pressure from said source moves said cylindrical member axially in said second tubular member, thus forcing fluid material of said first portion into said annular space to effectuate axial movement of said piston member toward said cam surface.

6. Apparatus in accordance with claim 5, wherein said fluid in said first portion is adapted to harden upon setting in said annular space, to thereby lock said piston member in place with said gripping means in gripping engagement with said pipe and said resilient engaging means in sealing engagement with said pipe.

7. Apparatus suitable for use in connecting a length of pipe to a suitable tubular member in difficult working environments comprising:

an elongate generally tubular housing of a diameter greater than the diameter of the pipe length to be joined, said housing adapted to be fitted around said pipe length to define an axially-extending annulus between the outer surface of said pipe length and the inner wall of said housing;

an elongate member including:
  an outer cylindrical surface substantially equal in diameter to the diameter of the inner wall of said housing, and
  an inner cylindrical surface having a diameter greater than the diameter of the outer surface of said pipe length,
  said elongate member being mounted in said annulus such that the outer cylindrical surface of said member is in sealing engagement with the inner wall of said housing, and said inner cylindrical surface is free from contact with said pipe length;

a first piston member including:
  a first portion having an outer cylindrical surface substantially equal in diameter to the diameter of the inner wall of said housing, and
  a second portion extending from said first portion toward said elongate member, said second portion having an outer cylindrical surface substantially equal in diameter to the diameter of the inner cylindrical surface of said elongate member,
  said piston member being mounted in said annulus such that said first portion is axially spaced from said elongate member, the outer cylindrical surface of said first portion being in sliding sealing engagement with the inner wall of said housing, and the outer cylindrical surface of said second portion being in sliding sealing engagement with the inner cylindrical surface of said elongate member, each said first portion and said second portion being substantially free of contact with said pipe length;

an annular space being defined between said first portion of said piston member and said elongate member, an inwardly sloping cam surface on the inner wall of said housing axially spaced from said piston member, said surface facing toward said piston member;

gripping means disposed in said annulus adjacent said cam surface, and adapted to move axially upon actuation into contact with said cam surface and to be thereby radially moved into gripping engagement with said pipe length;

resilient engaging means mounted in said annulus between said piston member and said gripping means, and substantially free of contact with said pipe length, said resilient engaging means adapted to move axially, upon actuation, an amount sufficient to move said gripping means against said cam surface, and upon further actuation to be compressed into sealing engagement with the outer surface of said pipe length on one side and the inner wall of said housing on the other to effect a seal between said housing and said pipe length;

actuation of each said resilient engaging means and said gripping means being effected by axial movement of said piston member toward said surface; and a source of fluid under pressure remote from said housing but connected through an opening in said housing into fluid communication with said annular space, whereupon entry of fluid under pressure into said annular space is effective to axially move said piston member toward said cam surface.

8. Apparatus in accordance with claim 7, wherein said apparatus further comprises means to fix said piston member in place with said gripping means in gripping engagement with said pipe and said resilient engaging means in sealing engagement with said pipe.

9. Apparatus in accordance with claim 7, wherein said elongate member is a piston which is free for sliding axial movement within said annulus simultaneously with said first piston member.

10. Apparatus in accordance with claim 7, wherein guide means are included adjacent an end of said housing to facilitate insertion of said pipe length into said housing.

11. Apparatus suitable for use in connecting a length of pipe to a suitable tubular member in difficult working environments comprising:

an elongate generally tubular housing of a diameter greater than the diameter of the pipe length to be joined, said housing adapted to be fitted around said pipe length to define an axially-extending annulus between the outer surface of said pipe length and the inner wall of said housing;

an elongate member including:
  an outer cylindrical surface substantially equal in diameter to the diameter of the inner wall of said housing, and
  an inner cylindrical surface having a diameter greater than the diameter of the outer surface of said pipe length,
  said elongate member being mounted in said annulus such that the outer cylindrical surface of said member is in sealing engagement with the inner wall of said housing, and said inner cylindrical surface is free from contact with said pipe length;

a first piston member including:
  a first portion having an outer cylindrical surface substantially equal in diameter to the diameter of the inner wall of said housing, and
  a second portion extending from said first portion toward said elongate member, said second portion having an outer cylindrical surface substantially equal in diameter to the diameter of the inner cylindrical surface of said elongate member, said piston member being mounted in said annulus such that said first portion is axially spaced from said elongate member, the outer cylindrical surface of said first portion being in sliding sealing engagement with the inner wall of said housing, and the outer cylindrical surface of said second portion being in sliding sealing engagement with the inner cylindrical surface of said elongate member, each said first portion and said second portion being substantially free of contact with said pipe length;

an annular space being defined between said first portion of said piston member and said elongate member;

an inwardly sloping cam surface on the inner wall of said housing axially spaced from said piston member, said surface facing toward said piston member;

gripping means disposed in said annulus adjacent said cam surface, and adapted to move axially upon actuation into contact with said cam surface and to be thereby radially moved into gripping engagement with said pipe length;

resilient engaging means mounted in said annulus between said piston member and said gripping means, and substantially free of contact with said pipe length, said resilient engaging means adapted to move axially, upon actuation, an amount sufficient to move said gripping means against said cam surface, and upon further actuation to be compressed into sealing engagement with the outer surface of said pipe length on one side and the inner wall of said housing on the other to effect a seal between said housing and said pipe length;

actuation of each said resilient engaging means and said gripping means being effected by axial movement of said piston member toward said cam surface; and, a second tubular member adapted to be positioned remote from said housing, said second tubular member having an axially movable cylindrical member therein dividing said second tubular member into first and second portions, said first portion having fluid therein and being in fluid communication through a suitable conduit with said annular space, said second portion being in fluid communication with a source of fluid under pressure, and in fluid isolation with said first portion, wherein application of pressure from said source moves said cylindrical member axially in said second tubular member, thus forcing fluid material of said first portion into said annular space to effectuate axial movement of said piston member toward said cam surface.

12. Apparatus in accordance with claim 11, wherein said fluid in said first portion is adapted to harden upon setting in said annular space, to thereby lock said piston member in place with said gripping means in gripping engagement with said pipe and said resilient engaging means in sealing engagement with said pipe.

References Cited

UNITED STATES PATENTS

| | | | |
|---|---|---|---|
| 2,001,946 | 5/1935 | Tschappat | 285—148 |
| 2,017,994 | 10/1935 | Spang | 285—105 |
| 2,159,640 | 5/1939 | Strom | 285—101 X |
| 2,561,957 | 7/1951 | Teague | 251—57 X |
| 2,897,895 | 8/1959 | Ortloff | 286 |
| 3,097,866 | 7/1963 | Iversen | 285—101 X |
| 3,142,500 | 7/1964 | Wesseler | 285—342 X |
| 3,209,829 | 10/1965 | Haeber | 285—18 X |
| 3,284,105 | 11/1966 | Leutwyler | 285—3 |

FOREIGN PATENTS

| | | |
|---|---|---|
| 556,256 | 9/1943 | Great Britain. |
| 102,112 | 8/1962 | Netherlands. |

EDWARD C. ALLEN, *Primary Examiner.*

R. G. BERKLEY, *Assistant Examiner.*